United States Patent Office 2,954,105
Patented Sept. 27, 1960

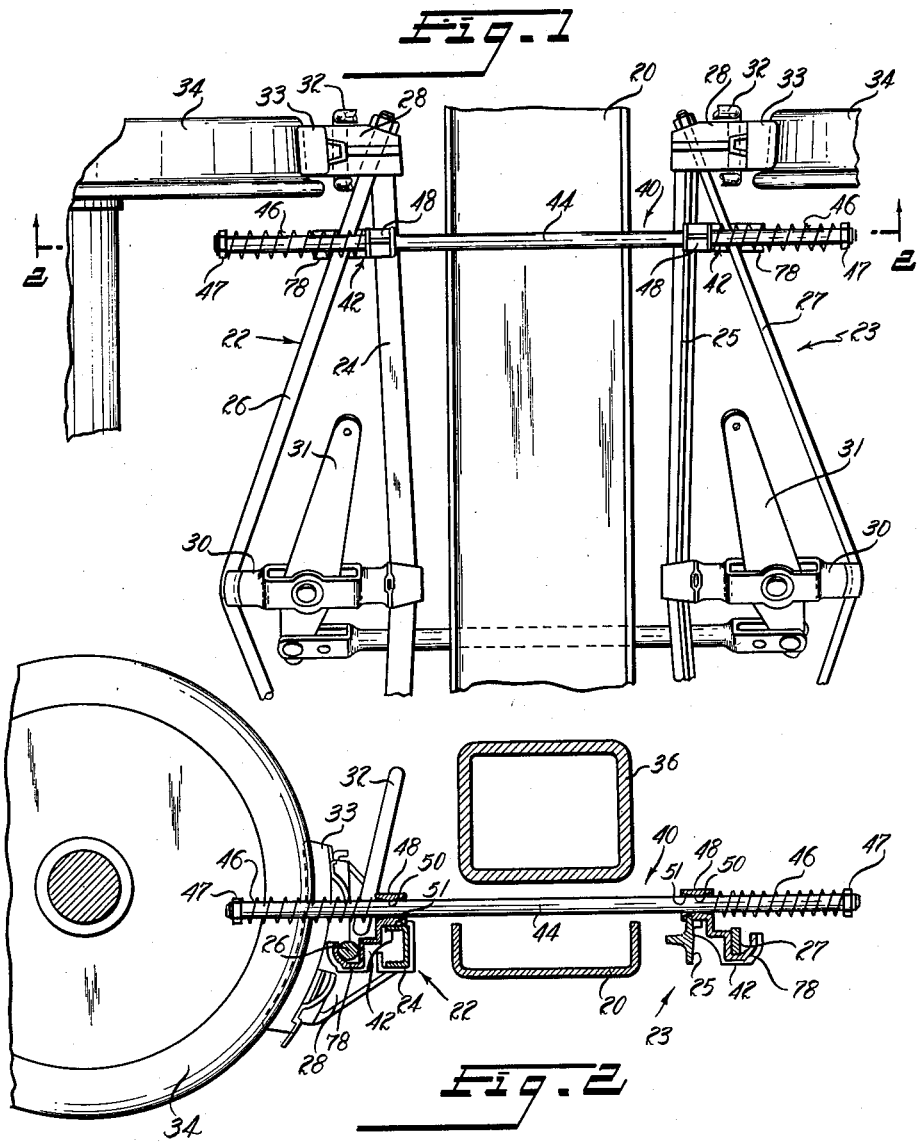

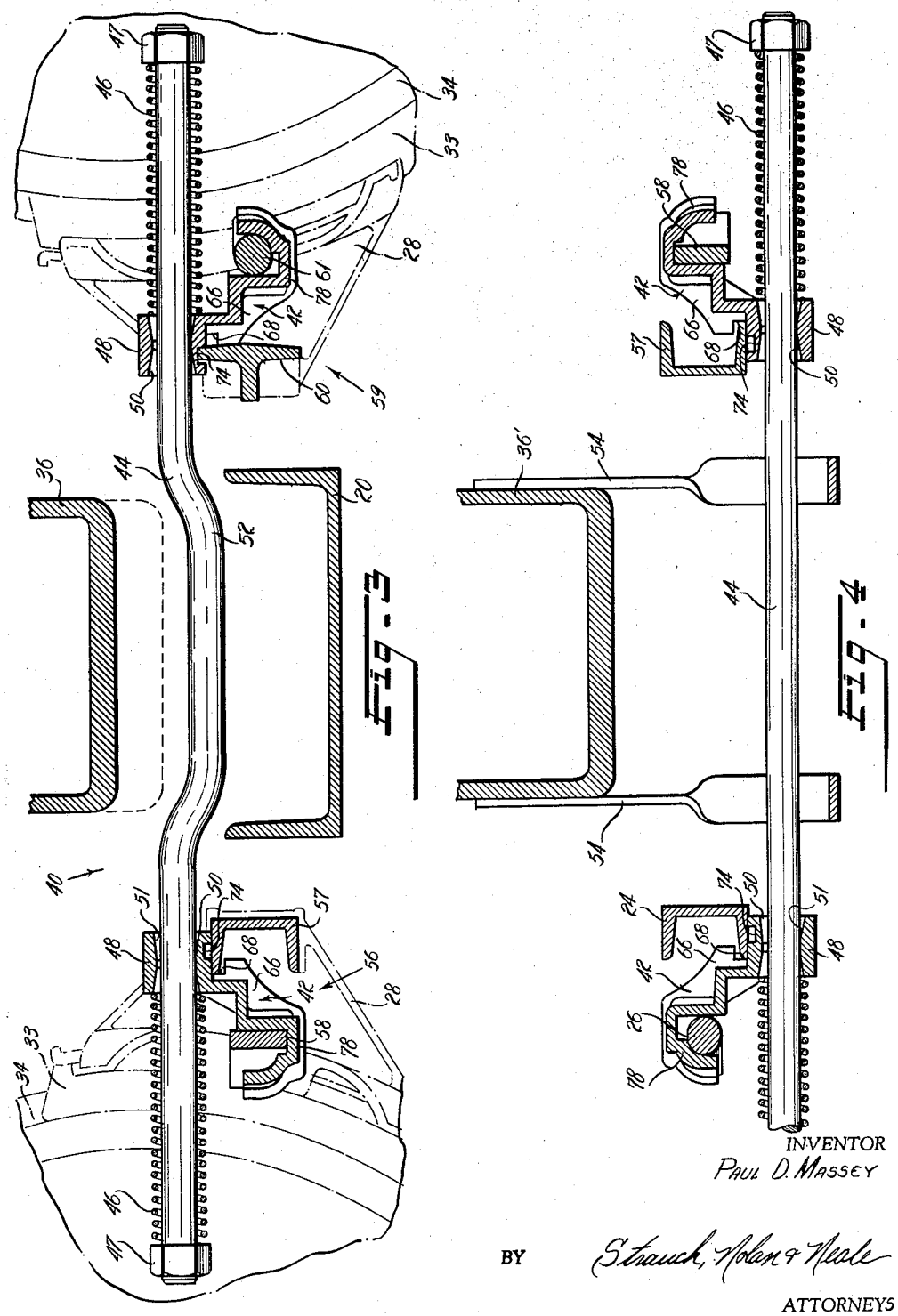

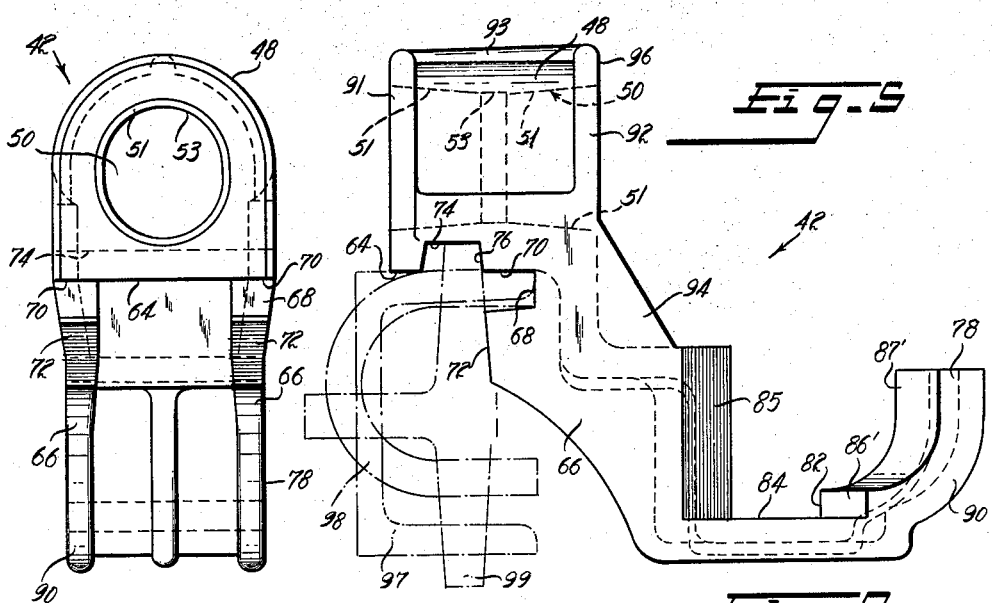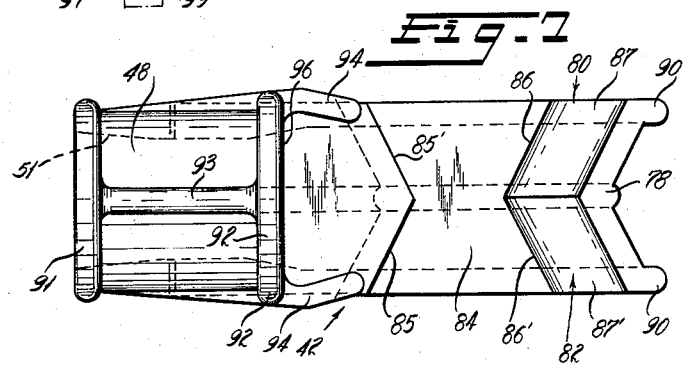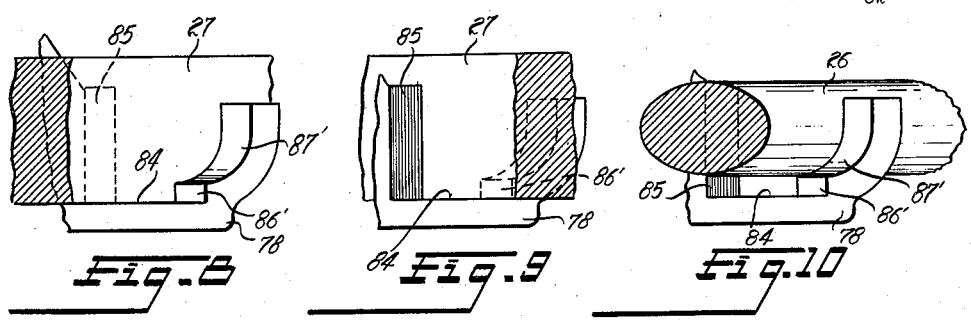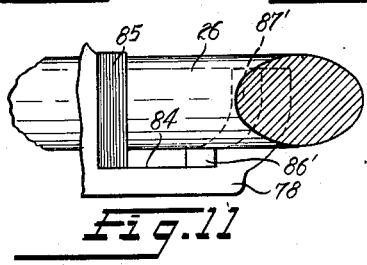

2,954,105

BRAKE BEAM SAFETY SUPPORT AND UNIVERSAL SUPPORT BRACKET THEREFOR

Paul D. Massey, South Whitley, Ind., assignor to Grip Nut Company, South Whitley, Ind., a corporation of Illinois Filed May 23, 1956, Ser. No. 586,802

9 Claims. (Cl. 188—210)

This invention relates to railway brake beam safety supports and more particularly to a universal brake beam safety support that can be used with the various standard railway car trucks. The present invention accomplishes this desirable result primarily through the provision of a novel universal brake beam bracket capable of fitting the various standard type brake beam compression members and brake beam tension members, the bracket being capable of interchangeable use on either end of either set of compression and tension members customarily provided in use.

Because of the danger resulting from brake hanger failure, which is a more or less common occurrence that can result in derailment when the beam drops the brake head and shoe onto the track in front of the wheels, brake beam safety supports were developed to provide emergency support of the brake beam or beams in case of hanger failure. Over the years the brake beam safety support art has been quite extensively developed but, to applicant's knowledge, no universal beam safety support has ever been invented, disclosed or described.

When a brake beam safety support is incorporated in a suitably operable manner on the brake beams of a railway car, two primary conditions must be satisfied. First, the brakes must be capable of application and release without obstruction under all normal operating conditions with the safety support in place for an emergency. Second, the cooperative engagement of the safety support with the brake beam must provide for an entirely different operating condition when any of the brake beam hangers have failed to allow the beam to lower itself to a position where the safety support becomes operative. In both of the stated conditions, the safety support must permit the brake shoe to approach and engage the wheel along the contour of the wheel periphery. Many of the prior art safety supports, although functioning well to prevent dangerous dislocation of the brake beam due to hanger failure, are not acceptable because they provide too rigid a support under the aforementioned conditions causing excessive wear and, in at least the second condition, causing erroneous brake shoe application.

Ideally, safety supports should fit all railway trucks with their various types of brake beams, all of which are accepted standards. Standardized brake beams have compression and tension members that can be of various shapes. Compression members of channel cross section, U-section and T-section, the latter when used with a round tension member being known as the "Davis" type compression beam, are found in standard beams. Furthermore, brake beams using any one of these types of compression members can utilize either a round rod or rectangular section tension member. Thus, it can readily be seen that many combinations of different compression and tension members can be and are used in standard beams. Because of the different cross sections of the available compression and tension members, interengagement of prior art safety support brackets with the brake beam did not occur at standard predetermined positions relative to the truck frame. Thus in the past the safety support bracket units have had to be individually designed for the different combinations of compression and tension members. In some instances the units were designed to fit channel and T-beams and would fit either the rectangular or circular beam but the abutting engagement between the support bracket and the compression and tension members would vary in lateral position due to the necessarily different construction of assembled brake beams using different types of compression and tension members. Further it was almost universally necessary to provide right and left hand bracket members due to the opposite angles of convergence on the right and left hand sides of the brake beams.

Additional factors complicating standardization were introduced because of the various standardized bolster arrangements on railway car trucks. For example, one form of truck utilizes a spring plank below the bolster extending between the truck frames and a certain amount of clearance is provided between the bolster and spring plank to permit proper bolster travel for different weight cars and under various load conditions. In some of these installations there is sufficient clearance between the bolster and the spring plank, even when the bolster travels to a solid spring condition, to permit passage of a straight brake beam safety support rod between the truck bolster and spring plank. However in other types of spring plank trucks the lower limit of bolster travel does not provide sufficient clearance for a straight support rod. In this latter type of truck the prior art has proposed an off-set rod, which must still be used on these type trucks when the safety support rod passes over the plank. Other type trucks are designed to omit the spring plank and in this instance the lower surface of the bolster is normally positioned closer to the plane of the brake beam member which does not permit sufficient clearance under bolster travel limits to enable the safety support rod to be positioned above the brake beams. In such installations the support rod is positioned to pass below the brake beams through special hanger loops fastened to the bolster. Taking all of the foregoing variations of standard trucks and brake beams into consideration, it will be realized that numerous safety support brackets, both right and left hand, had to be provided for initial installation and replacement service.

Besides fitting all standard car trucks and components the safety support assembly should be light in weight without sacrificing strength and have as few, simple parts as possible, assuring satisfactory service and minimum maintenance. Installation should be accomplished simply and quickly with no need to jack the car or remove trucks and the safety support should be capable of installation on loaded or empty cars. There should be no drilling, riveting or welding between the safety support and the truck. The support should be fastened to the brake beam only and, when in normal position, it should not contact other components of the truck. The safety support bracket should be one piece, should fit all standard brake beams, should be capable of use on either the right or left hand side of the brake beam and in each installation must assure proper location of the bracket at the time it is installed and during service. Cooperation between the bracket and the compression and tension members should assure that the clamp will not be able to tilt sideways. The safety support assembly should permit sufficient swinging movement of the brake beam in both the normal and emergency positions to provide proper application of the brake shoe along the contour of the wheel periphery during brake application.

By this invention all of the foregoing factors have been realized.

Accordingly, a primary object of this invention is to provide a universal brake beam safety support assembly suitable for use with any of the standard railway car truck assemblies and standard brake beam assemblies.

Another object resides in providing a novel brake beam safety support using a standard length support rod and unitary single piece universal brake beam support brackets suitable for use with the various standard brake beam assemblies.

Still another object resides in providing for use in a standardized brake beam support assembly, a brake beam safety bracket having means thereon for engaging and supporting the compression and tension members of a brake beam wherein the compression members can be any of the various acceptable types such as channel, U or T-shaped cross sections and regardless of whether the tension members are rectangular or annular cross sectioned, and the cooperative engagement between the bracket unit and the compression and tension members will be such as to provide a standard distance between the fore and aft bracket unit bosses that structurally cooperate with the safety support rod to thereby enable a standard length rod to be used in the support assembly with all standard trucks.

A further object of this invention resides in providing a brake beam safety support bracket of unitary construction capable of being fastened to the right or left hand side of standard type brake beams using any of the various acceptable compression members such as channel, U or T-shaped cross section or compression members and a rectangular or annular cross section tension member and permitting installation of the safety support rod above or below the brake beam.

A further object resides in providing a brake beam safety support bracket capable of universal use with a safety support rod positioned above or below a brake beam and with the same bracket capable of interchangeable use on either the right or left hand side of both front and rear brake beams.

Further novel features and objects of this invention will become apparent from the following detailed description and the appended claims taken in conjunction with the accompanying drawings showing preferred embodiments thereof, in which:

Figure 1 illustrates a partial top plan view of a railway car truck of the spring plank type incorporating the safety support assembly of this invention with the bolster and other details, not essential to this invention, omitted, the left side brake beam having a channel type compression member and a circular section tension member while the right side brake beam shows a T-section compression member and a rectangular section tension member;

Figure 2 is a section taken on line 2—2 of Figure 1, illustrating a side view of one safety support assembly positioned between the bolster and the spring plank;

Figure 3 is an enlarged detail illustrating the use of the brake beam safety support assembly with a spring plank truck having an off-set rod to permit correct bolster travel. This view shows the brake beam support brackets in section and the left and right hand brake beams are of different standard style;

Figure 4 is an enlarged detail view illustrating the use of the brake beam support assembly of this invention on a spring plankless truck where the safety support rod is disposed below the brake beams, in this instance the left and right hand beams being different styles to show the universal nature of the safety support brackets;

Figure 5 is a side elevation view of the safety support bracket with cooperative engagement with channel shaped, U-shaped and T-shaped compression members illustrated by phantom lines;

Figure 6 is an end elevation view from the left hand side of the bracket in Figure 5;

Figure 7 is a top plan view of the bracket in Figure 5, illustrating the intersecting compound tension member grooves;

Figures 8 and 9 illustrate cooperation between the tension member grooves of the bracket units and a rectangular section tension member, Figure 8 illustrating the tension member angled in one direction and Figure 9 illustrating the tension member angled in the opposite direction; and Figures 10 and 11 are similar to Figures 8 and 9 showing the installation of round or annular section tension members.

With reference to the drawings, Figure 1 shows several details of a railway car truck using a spring plank 20. In conventional railway car truck structure, brake beams 22 and 23 are carried by the car truck, one in front and one behind the spring plank 20. Each of the brake beams 22 and 23 includes a compression member 24 and 25 respectively, and a tension member 26 and 27 respectively, the compression members and tension members converging toward and being arranged to carry brake shoe heads 28 at each end. A compression link 30 is centrally disposed between the tension and compression members of each brake beam and pivotally carries brake operating levers 31 which, through associated linkage, are connected to the brake actuating mechanism (not shown) whereby brake actuation will cause simultaneous movement of both brake beams into and away from braking application. Each brake beam 22 and 23, together with the rigidly fixed brake heads 28, is supported on the truck frames (not shown) by swinging hangers 32 pivotally connected to each brake head 28 and pivotally supported in bosses provided on the truck frame. Thus whenever the brake beams are moved into braking engagement the beam and brake head assembly may swingingly pivot to enable conformity of the contoured brake shoes 33 against the periphery of the truck wheels 34. Although the truck bolster 36 has been omitted in Figure 1, its relationship above the spring plank 20 is clearly illustrated in Figure 2.

Assuming the left hand side is the front of a truck, Figures 1 and 2 illustrate the arrangement of a brake beam safety support assembly 40 disposed above spring plank 20 and brake beams 22 and 23, with support brackets 42 in support engaging cooperation adjacent the right hand ends of front brake beam 22 and rear brake beam 23. The support assembly 40 consists of a bracket support rod 44 that may be installed to extend over or under the fore and aft brake beams, a support bracket 42 cooperating with each brake beam and slidably disposed over the ends of support rod 44, compression springs 46 disposed on the ends of rod 44 in compressive engagement with brackets 42 and retained on rods 44 by nuts 47 threadedly fastened to the ends of rod 44. Nuts 47 are preferably of the self locking type. With such an arrangement, compression springs 46, through the cooperating brackets 42, urge the fore and aft brake beams 22 and 23 toward each other which moves the brake shoes away from engagement with the wheels. Upon brake actuation by the actuating linkage and links 31, brake beams 22 and 23 are positively moved apart from each other, placing shoes 33 into braking engagement and compressing the springs 46 against nuts 47. As illustrated in Figure 2, the position of brake beams 22 and 23, when normally supported by hangers 32, will support the safety support rod 44 a slight distance above the spring plank 20. It is to be noted that in normal position the only truck parts engaged by the brake beam safety support assemblies are the two brake beams.

Each brake support bracket 42 includes a boss portion 48 horizontally apertured at 50. The apertures 50 have convergent walls 51 from each end to an intermediate portion 53 and their cross-sectional area is vertically elongated to enable slight vertical freedom for the rod 44 which projects through the apertures 50. The specific convergent formation of the apertures 50 will be described in greater detail hereinafter but, at this stage in the description, it is deemed desirable to point out that the vertical cross-sectional elongation of the aperture 50 together with the convergent walls, enables pivotal movement of the brake beam assemblies relative to the support rod 44. Thus, normal position application of force tending to move the brake beam assemblies into braking position is not restrained in any manner by the structural cooperation between the support rods 44 and the support brackets 42. The same is true during functioning of the brake beams in emergency support position, i.e., whenever a beam hanger has broken or become disengaged and the brake beam drops so the support rod 44 rests on spring plank 20 and thereafter carries the weight of the brake beam through the individual support brackets 42. This relationship between support rods 44 and the apertures 50 of support brackets 42 is shown in Figures 1 and 2 and in larger detail in Figures 3 and 4.

Before proceeding with a detailed description of the construction of universal support brackets 42, reference is made to Figures 3 and 4 wherein two major types of car truck assemblies are illustrated. Figure 3 illustrates a spring plank truck assembly with plank 20 below the bolster 36. In this assembly the brake safety support assembly 40 is disposed with the support rod 44 extending between spring plank 20 and bolster 36 and projecting over the fore and aft brake beam assemblies 56 and 59 respectively. As previously described, such an installation includes safety brackets 42 that extend down from support rod 44 to structurally interengage with the convergent ends of the compression tension members of the brake beams. In normal position, the support rod 44 will rest on the bottom of apertures 50 in respective fore and aft safety brackets 42. In an emergency position, the support rod 44 will rest on spring plank 20, and the safety brackets 42 and the brake beams will hang from the rod.

Figure 4 illustrates the second major type of truck assembly utilizing a bolster 36' without a spring plank and known as the spring plankless type of truck assembly. In this assembly the lower surface of bolster 36' is disposed much closer to a plane across the top of the fore and aft brake beam assemblies than is true of the installation described for Figure 3. Because of this close arrangement between bolster 36' and the brake beam assemblies, it is impossible to pass the safety support rod 44 above the brake beam assemblies with sufficient clearance from bolster 36' to permit bolster movement due to spring compression. Therefore, rod 44 is disposed below the brake beam assemblies and the safety support brackets 42 are reversed to hang in structural cooperation between the convergent ends of the compression and tension members of the brake beam assemblies so apertured boss 48 is below the brake beams. The support rod 44 passes through a set of hanger brackets 54 rigidly fixed to the bolster 36' as by welding, riveting or bolting. A front and rear hanger loop 54 are provided for each safety support assembly. In event of a brake beam hanger failure, the brake beam will drop so safety support rod 44 rests on hanger loops 54 and the loose brake beam will be supported on top of rod 44 by safety brackets 42.

In the spring plank type truck assembly some installations permit the bolster 36 to have a downward limit, to a position where the springs of the truck suspension system become solid, which will prevent use of a straight support rod 44. To overcome this problem a slight bend 52 is formed in the support rod 44 under the bolster, and this feature must be used with this invention whenever such latter spring plank type truck assemblies are encountered.

Several of the standard brake beam assemblies which can be preassembled from the various acceptable styles of compression and tension members are illustrated in Figures 1 through 4. In Figures 1 and 2 the left hand brake beam 22 has a channel shaped compression member 24 and an annular (round) tension member 26 while the right hand brake beam assembly 23 has a T-section compression member 25 and a rectangular section tension member 27. In Figure 3 the left hand brake beam assembly 56 consists of a channel shaped compression member 57 with a rectangular shape tension member 58 while the right hand brake beam assembly 59 consists of a T-shaped compression member 60 with an annular (round) cross section tension member 61. Figure 4 has a left hand brake beam assembly identical to the brake beam assembly 22 in Figure 2 while its right hand brake beam assembly is identical to the left hand brake assembly 56 in Figure 3. However, the safety support brackets 42 are reversed in both brake beam installations of Figure 4.

*Universal support bracket*

The universal support bracket 42 (Figures 5–7) is a unitary item made by forging, casting, machining or a combination of known methods. One end of bracket 42 includes the aforementioned boss portion 48 with aperture 50 disposed horizontally therethrough. When bracket 42 is positioned as illustrated in Figures 5 and 6, so a support rod will pass over the brake beams, the lower face 64 of boss portion 48 lies in a horizontal plane extending between the sides of boss 48. Two vertically disposed flanges 66, integral with the mid portion of bracket 42, extend down from adjacent each side of the horizontal face 64 to a position coextensive with the bottom of the bracket. Recesses 68 are provided in the vertical flanges 66 adjacent the horizontal plane face 64 and, in essence, provide a coextensive lateral groove having its top surface 70 lying in the horizontal plane face 64. The upper forward edge portions of flanges 66 lie in a common plane having a slight inclination from a true normal position relative to the axis of aperture 50 and provide two spaced apart abutment faces 72 disposed below the horizontal plane face 64. A lateral groove 74 normal to the axis of aperture 50 is formed in the horizontal plane face 64 with its rear side wall 76 lying in a common plane with abutment faces 72 on vertical flanges 66.

The opposite end portion 78 of support bracket 42 is longitudinally aligned with the boss portion 48 and, in the position illustrated in Figure 5, is off-set below and to the rear of boss portion 48. The upper surface of end portion 78 is formed with two compound grooves 80 and 82 extending horizontally at equal but opposite angles relative to a vertical plane containing the axis of aperture 50, resulting in the compound complemental formation in the upper surface of portion 78 clearly shown in Figure 7. Each of the compound grooves 80 and 82 is constructed to receive a rectangular cross section tension member abutting the horizontal surface 84 and vertical surfaces 85 and 86 when inclined in one direction or abutting vertical surfaces 85' and 86' when inclined in the other direction. Each compound groove 80 and 82 also includes provision for alternatively receiving an annular (round) tension bar which is engaged by curved surfaces 87 and the vertical surface 85 or curved surface 87' and vertical surface 85' dependent on the angle of inclination that the tension member has relative to the assembled position of the support bracket 42. Various reinforcing ribs such as 90, 91, 92 and 93 are suitably integrally formed on the various portions of each bracket support member 42. Gusset members 94 are formed integral with the support bracket and extend between the boss portion 48 and the opposite end portions 78 on opposite sides of the bracket 42 relative to the vertical flanges 66. The inner face 96 (right hand side in Figure 5) of boss portion 48 provides an abutment surface for the spring member 46. Note in Figure 6 the vertically elongated cross-section of aperture 50. This, as has been previously described, enables a small degree of vertical freedom between a support rod 44 and a support bracket 42 when assembled.

The plane that includes abutment faces 72 on vertical flanges 66 and the rear side surface 76 of the lateral groove 74 is arranged normal to a vertical plane through and including the axis of aperture 50. Thus, when the abutment faces 72 and the rear side surface 76 of groove 74 are placed flat against the substantially vertical surface of a T-section compression beam, the axis of aperture 50 will be disposed essentially normal to that substantially vertical surface. The same relationship of the axis of aperture 50 to the compression beam results when groove 68 cooperates with one flange of a channel or U-section compression member.

Looking now at Figure 1, it will be seen that each end of each brake beam assembly consists of one end of a compression member and one end of a tension member convergently arranged and joined at their ends. This provides a predetermined convergent angle which is standard regardless of the type of standard brake beam assembly under discussion. In other words the ends of the brake beam assembly 22 at the left hand of Figure 1 have the same angle of convergence between compression member 24 and tension member 26 as do the ends of the brake beam assembly 23 at the right hand of Figure 1. This angle of convergence is equal to the angles made by each of compound grooves 80 and 82 with a vertical plane normal to the axis of aperture 50.

A close inspection of Figure 1 will show a slight bend in each of the compression members 24 and 25. In standard brake beam assemblies this bend in the compression member is 4°. In such a construction when the universal bracket 42 is placed, for example, between compression member 24 and tension member 26 the longitudinal axis of aperture 50 will be normal to the compression member 24, which relationship results in the longitudinal axis of aperture 50 being cocked 4° from the longitudinal truck axis. With the forward support bracket 42 cocked 4° sideways in one direction and the rear support bracket 42 cocked 4° to the side in the opposite direction there is a total of 8° divergence from a longitudinal axis through the apertures 50 of the two support brackets 42. To enable the support rod 42 to freely pass through the apertures of both fore and aft brackets 42 the aperture side walls 51 are formed with at least a 4° convergence from either end to the intermediate portion 53 substantially midway of the ends of the aperture. The rod 44 is slightly smaller than the small dimension of the aperture midportion which with the convergent formation will permit free passage of a rod 44 with coaxial end portions between the apertures of the fore and aft brackets 42 without excessive frictional contact which would result in wear on the support rod 44 and the bracket bosses 48. Inasmuch as the 4° convergence from either end of aperture 50 is provided completely around the periphery of the aperture a support bracket 42 can be installed on either the right or left hand side of any brake beam.

Still viewing Figure 1, it will be seen that a brake beam construction utilizing a channel shape compression member 24 results in an intersection of the compression member and tension member at a position inset a further distance from the brake beam end than does the intersection of compression and tension members in a brake beam assembly utilizing a T-section compression member as illustrated by brake beam assembly 23 at the right hand of Figure 1. Thus if the same longitudinal locating abutment between a bracket 42 and the compression beam structure were to be used with the channel beam and the T-beam, the bracket 42 installed on a T-section compression member would be located closer to the end of a brake beam than a bracket 42 located on a brake beam utilizing a channel shaped compression member, as in the left hand brake beam of Figure 1. To compensate for this inherent relationship between the two standard brake beam assemblies, the aforementioned construction details of support bracket 42 permit cooperation between the support bracket and the compression members in such a manner that bracket 42 more deeply engages channel or U-section compression beams than it does a T-section compression beam.

For clear comparison, Figure 5 depicts the cooperative arrangement of bracket 42 with a channel section compression beam 97 and a U-shaped cross section compression beam 98. In each instance one flange of the compression member is disposed in engagement with the horizontal plane surface 64 and its edge is projected into recesses 68 provided at the top of vertical flanges 66. Abutment of the edges of the channel flanges against the base of recesses 68 determines the longitudinal position of bracket 42 relative to the compression member. In this position the opposite end portion 78 of the bracket 42 will be disposed in a confining relation to the respective angled tension member and the cooperative engagement between the horizontal plane surface 64 and the side edge of the channel flange and between the various surfaces of one of the compound grooves 80 and 82 and the associated tension member will be maintained by cooperation of the support rod 44 in apertures 50. This latter cooperation prevents a vertical cocking of the support bracket 42 out of interlocking position with the associated compression and tension members. The biasing force of springs 46 will urge the brackets 42 toward the convergent end of the brake beam assembly because of the inclined relationship of the tension member and the compound bracket groove.

Still referring to Figure 5, the association of a brake beam bracket 42 with a T-section compression beam 99 is illustrated. One of the T flanges is disposed so its upper edge is engaged and disposed in the horizontal groove 74 formed in the horizontal plane surface 64 of bracket base 48 and the slightly inclined flanged surface disposed in abutment against the two abutment faces 72 of vertical bracket flanges 66 and the rear side surface 76 of the horizontal groove 74. This arrangement provides both vertical and longitudinal alignment of bracket 42 relative to the T-shaped compression member 99. In a manner similar to that described for channel and U-shaped compression members, bracket 42 has a structural cooperation between a T-shaped compression member and its respective tension member, in conjunction with the support rod springs 46, that will maintain the support brackets 42 at a proper position relative to the joined ends of the compression and tension members of each brake beam.

Figures 8 and 9 illustrate the disposition of a rectangular tension bar 27 against the plane surfaces 84, 85 and 86 of the compound groove 80 (Figure 8) and against the corresponding plane surfaces 84, 85′ and 86′ of compound groove 82 (Figure 9).

Figures 10 and 11 illustrate the dispositions of a round tension bar 26 relative to the curved surface 87 and plane surface 85 of compound groove 82 (Figure 10) and against the curved surface 87′ and plane surface 85′ of compound groove 80 (Figure 11).

In the safety support assembly 40, consisting of the support rod 44, two brackets 42, two springs 46 and two locking nuts 47, there is sufficient play provided by the 4° convergent ends of apertures 50 in each of the brackets 42 to enable a preassembled safety support assembly 40 to be later installed without disassembly in either a spring plank type truck or a spring plankless type truck by a slight manipulation of the brackets 42 relative to support rod 44, as the assembly is placed in proper position and each end bracket is clipped into cooperative engagement with the brake beam end portions.

By the foregoing description there is herein fully disclosed an improved brake beam safety support assembly that incorporates a novel single piece universal support bracket for use on one as well as another of the various different types of railway car truck brake beam assemblies that are standard. The safety support assembly is so constructed that it can be pre-assembled in a factory or depot and later installed on trucks in the field without the necessity of field disassembly. The universal bracket will properly cooperate with a brake beam tension and compression member combination when fitted to either the right or left hand end of the beam and when attached from the top or from underneath so the safety support rod can be disposed above or below the brake beams.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A railway truck brake beam safety support bracket comprising: means adapted to be operatively connected to a support member and to enable said bracket to have an essentially universal pivoting movement relative to said support member; abutment means on said bracket providing bracket locating engagement with a brake beam compression member; and grooved means on said bracket for engagement with a brake beam tension member associated with said brake beam compression member, said grooved means comprising an intersecting set of compound grooves, each compound groove arranged at equal but opposite angles relative to said abutment means and having intersecting flat and curved wall surfaces for selectively providing vertical and lateral engagement with each of annular or rectangular cross-sectional shaped tension bars.

2. A brake beam safety support bracket comprising: a portion having a hole therethrough adapted to have an elongate support member projected therethrough, the wall of said hole being convergent from both ends to enable said bracket to have an essentially universal pivoting movement relative to the elongate support member; abutment means on said bracket providing bracket locating engagement with a brake beam compression member; and grooved means on said bracket for engagement with a brake beam tension member, said grooved means comprising an intersecting set of compound grooves, each compound groove arranged at equal but opposite angles relative to said abutment means and having intersecting flat and curved wall surfaces for selectively providing vertical and lateral engagement with each of at least two different cross-sectional shaped tension bars including those of rectangular cross section and those of annular cross section.

3. A single piece universal brake beam safety support bracket comprising: a part at one end of the bracket adapted to be fastened to a support element; a side of said bracket having a formation providing an inset with substantially vertical and horizontal intersecting wall surfaces, a first groove provided in said horizontal wall surface having one of its side surfaces substantially coextensive with said substantially vertical wall surface and a second groove in said substantially vertical wall surface having one of its side surfaces substantially coextensive with said substantially horizontal wall surface; the opposite side of the bracket adjacent the other end of said bracket having a formation providing two sets of grooves the axes of said sets of grooves being substantially parallel with said substantially horizontal wall surface and one groove of each set of said grooves having flat walls adapted to receive a member with a cross-section having straight sides and another groove of each set of said grooves having curved walls adapted to receive a member with an annular cross section having a curved side, each of the grooves in each set being parallel and disposed in partially overlapped relationship; said two sets of grooves being disposed in intersecting relation to provide equal but opposite angular relationships with said substantially vertical wall surface.

4. A universal brake safety support bracket comprising: an integral single piece body with a vertical formation and a horizontal formation, said formations being offset with respect to each other; said vertical formation having a horizontally disposed hole formed therethrough with the axis of said hole substantially parallel and disposed in vertical alignment relative to said horizontal formation; a substantially horizontal surface provided on the side of said vertical formation, said substantially horizontal surface being offset from the axis of said hole toward said horizontal formation; a substantially vertical surface on said body transverse to the axis of said hole, intersecting said substantially horizontal surface; a first horizontally extended groove provided in said substantially horizontal surface and having one of its side surfaces coextensive with said substantially vertical surface; a second horizontally extended groove in said substantially vertical surface having one of its side surfaces coextensive with said substantially horizontal surface; a first set of equiangular, intersecting, horizontally extending grooves having substantially squared horizontal bottom surfaces and vertical side surfaces provided in the side of said horizontal formation; and a second set of intersecting, horizontally extending grooves having walls of curved cross-section, disposed parallel to and in partially overlapped relation with said first set of grooves, in said side of said horizontal formation.

5. A universal brake beam safety support bracket as defined in claim 4 wherein at least a portion of the wall of said hole is convergent.

6. A universal brake beam safety support bracket as defined in claim 5 wherein the wall of said hole is convergent from both ends to a position intermediate its ends.

7. A universal brake beam safety support bracket as defined in claim 4, wherein the vertical cross-sectional dimension of said hole is larger than the horizontal cross-sectional dimension.

8. A one piece brake beam safety support bracket comprising: a portion with bracket locating means adapted to engage a brake beam compression member; a second portion for engagement with a brake beam tension member associated with said brake beam compression member having an intersecting set of compound grooves, each compound groove having intersecting flat and curved wall surfaces for selectively providing vertical and lateral engagement with each of at least two different cross-sectional shaped tension bars including those of rectangular cross-section and those of annular cross-section; at least one of said portions having a laterally disposed support rod hole formed therethrough, the wall of said hole having a convergent portion and the vertical cross-sectional dimension of said hole being larger than the horizontal cross-sectional dimension.

9. A brake beam safety support for use in combination with railway trucks and the truck brake rigging comprising: an elongate member extending fore and aft relative to said truck; support means on said truck disposed for a normal spaced relationship below said elongate member; identical single piece brackets disposed on each end portion of said elongate member and axially shiftable relative to said elongate member, each said bracket comprising: a portion having a hole therethrough with an end of said elongate member projected therethrough, the wall of said hole being convergent from both ends to enable said bracket to have an essentially universal pivoting movement relative to said elongate support member; abutment means on said bracket providing bracket locating engagement with a brake beam compression member; grooved means on said bracket for engagement with a brake beam tension member, said grooved means comprising an intersecting set of compound grooves, each compound groove arranged at equal but opposite angles relative to said abutment means and having intersecting flat and curved wall surfaces for selectively providing vertical and lateral engagement with each of annular or rectangular cross sectional shaped tension bars; and means operatively engaging said elongate member and said brackets resiliently biasing said brackets toward each other.

References Cited in the file of this patent

UNITED STATES PATENTS

| | | |
|---|---|---|
| 2,196,249 | Busse | Apr. 9, 1940 |
| 2,505,974 | Kass | May 2, 1950 |
| 2,746,576 | Lewis et al. | May 22, 1956 |